(12) United States Patent
Chen et al.

(10) Patent No.: US 11,841,586 B1
(45) Date of Patent: Dec. 12, 2023

(54) POSITION-ADJUSTABLE BACKLIGHT

(71) Applicant: Dell Products L.P., Round Rock, TX (US)

(72) Inventors: Ching-Feng Chen, New Taipei (TW);
Chao-Kai Huang, Taipei County (TW);
Yi-Fan Wang, Taipei (TW);
Meng-Feng Hung, Taoyuan (TW);
Wei-Ching Hsu, Hsinchu (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/870,125

(22) Filed: Jul. 21, 2022

(51) Int. Cl.
*G02F 1/1335* (2006.01)
*G02F 1/13357* (2006.01)

(52) U.S. Cl.
CPC .. *G02F 1/133612* (2021.01); *G02F 1/133603* (2013.01); *G02F 1/133608* (2013.01)

(58) Field of Classification Search
CPC ......... G02F 1/133612; G02F 1/133603; G02F 1/133608
See application file for complete search history.

(56) References Cited

U.S. PATENT DOCUMENTS

| | | | |
|---|---|---|---|
| 7,283,118 B2 | 10/2007 | Nagatani | |
| 7,425,729 B2 | 9/2008 | Yun et al. | |
| 9,551,477 B2 * | 1/2017 | Chien | ..... F21V 29/70 |
| 11,227,853 B2 | 1/2022 | Israel et al. | |
| 2005/0233485 A1 | 10/2005 | Shishov et al. | |
| 2007/0211492 A1 | 9/2007 | Lin | |
| 2016/0154170 A1* | 6/2016 | Thompson | ..... G02B 6/005 362/555 |
| 2021/0240020 A1* | 8/2021 | Chang | ..... G02F 1/133603 |

FOREIGN PATENT DOCUMENTS

| | | | | |
|---|---|---|---|---|
| CN | 107327753 | | * 11/2017 | |
| CN | 209641286 U | | * 11/2019 | |
| EP | 1171860 B1 | | * 9/2004 | ..... G09F 9/375 |

OTHER PUBLICATIONS

English translation of Tang CN-209641286-U, published Nov. 2019 (Year: 2019).*
English translation of Shi CN 107327753 publishedNov. 2017 (Year: 2017).*
English translation of Fischer EP-1171860-B1, published Sep. 2004 (Year: 2004).*

* cited by examiner

*Primary Examiner* — Evan P Dzierzynski
(74) *Attorney, Agent, or Firm* — Larson Newman, LLP (57) ABSTRACT

A liquid crystal display has position-adjustable light sources. The light sources may be lamps, LEDs, or other emissive components. The light sources, however, are movable to adjust the locations or positions of their light outputs. The light sources ride upon electromagnet carriers. When currents are applied to the electromagnet carriers, each electromagnet carrier creates a corresponding magnetic field. The magnetic fields cause neighboring electromagnet carriers to attract or to repel, depending on the magnitude/polarity of the currents. The lateral and vertical positions of the electromagnet carriers may thus be adjusted by varying their respective currents and magnetic fields. Because the light sources ride on the electromagnet carriers, the light sources may be moved to refine an image generated by the liquid crystal display. The light sources, for example, may be moved to improve white/black contracts to reduce halo-effects.

20 Claims, 9 Drawing Sheets

POSITION-ADJUSTABLE BACKLIGHT

FIELD OF THE DISCLOSURE

This disclosure generally relates to display devices, and more particularly relates to backlight modules.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A liquid crystal display has position-adjustable light sources. The light sources may be lamps, LEDs, or other emissive components. The light sources, however, are movable to adjust the locations or positions of their light outputs. The light sources ride upon electromagnet carriers. When currents are applied to the electromagnet carriers, each electromagnet carrier creates a corresponding magnetic field. The magnetic fields cause neighboring electromagnet carriers to attract or to repel, depending on the magnitude/polarity of the currents. The lateral and vertical positions of the electromagnet carriers may thus be adjusted by varying their respective currents and magnetic fields. Because the light sources ride on the electromagnet carriers, the light sources may be moved to refine an image generated by the liquid crystal display. The light sources, for example, may be moved to improve white/black contracts to reduce halo-effects.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
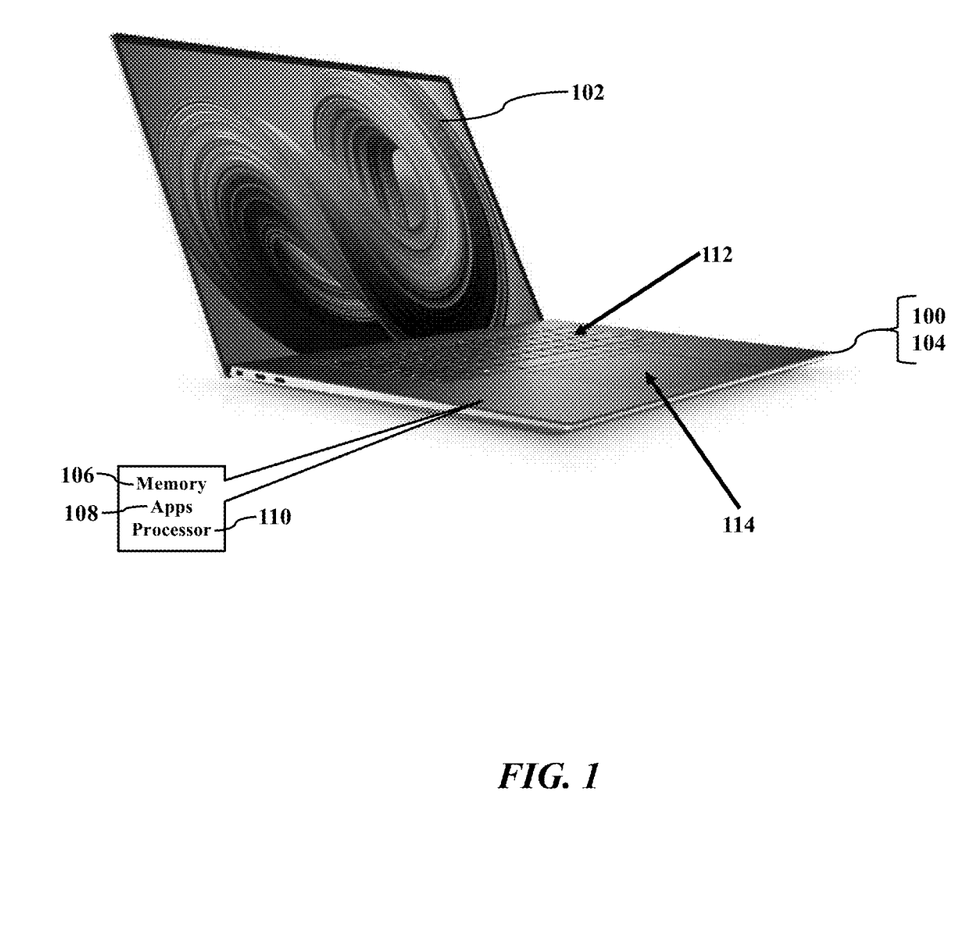
FIG. 1 illustrates a consumer electronics device having a liquid crystal display (LCD), according to exemplary embodiments.

FIG. 1 illustrates a consumer electronics device 100 such as a mobile laptop computer 104 having a liquid crystal display (LCD) 102, according to exemplary embodiments. The consumer electronics device also may be a television, computer monitor, tablet computer, smartphone, or any other processor-controlled device. The laptop computer's memory device 106 stores software applications 108, and a hardware processor 110 executes the software applications. A user of the laptop computer 104 types commands or inputs on a keyboard 112. The user may also make tactile selections using a click/touch pad 114. The hardware processor 110 interprets and executes the user's inputs according to the software applications 108. Outputs generated by the hardware processor 110 are displayed via the LCD 102.

LCDs are common in televisions, computer monitors, laptop/tablet computers, smartphones, and many other electronic devices. LCDs must have a light source behind them. The light source (or backlight) shines white light through pixels of the LCDs. A common problem, though, is that conventional backlights produce a halo. This halo effect is produced when the white backlight illuminates a black zone or portion of an LCD image. The white backlight, in other words, seeps into, and washes out, the black zone. The viewing user thus sees a displeasing cloudy grey color.

Figure 2:
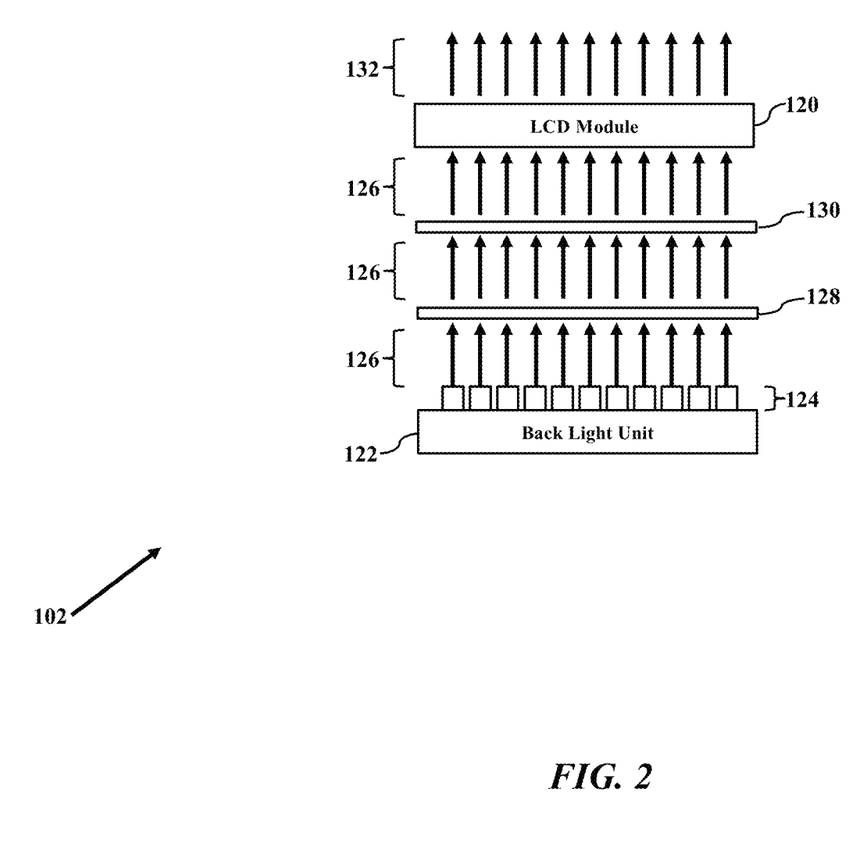
FIG. 2 is a simplified illustration of the LCD display, according to exemplary embodiments.

FIG. 2 shows the LCD as a sectional view to emphasize its two (2) major components: a liquid crystal module 120 above, on top of, or overlaying a backlight 122. The generally flat liquid crystal module 120 has a grid or matrix of millions, or even billions, of optical, liquid crystal devices (sometimes called red, green, and blue "pixels"), Indium-Tin Oxide (or "ITO") electrodes, glass panels, polarizing filters, color filters, and perhaps many other components. The backlight 122 has hundreds, thousands, or more of light sources 124. When electrical power (current/voltage/charge) is applied to any light source 124, the light source 124 emits visible, white light 126. An optical light guide 128 may align, focus, refract, or guide the light 126 into a diffuser 130. The diffuser 130 then nearly evenly spreads the light 126 across the liquid crystal module 120. When the electrical power (current/voltage/charge) is applied to the liquid crystal module 120, the liquid crystal module 120 generates an image 132. Because the backlight 122 is oriented behind, or below, the liquid crystal module 120, the bright white light 126 propagates into and through the liquid crystal module 120, thus backlighting and illuminating the image 132 generated by the liquid crystal module 120. The componentry and operation of the LCD 102 is generally known, so this disclosure need not dwell on the known details.

Figure 3:
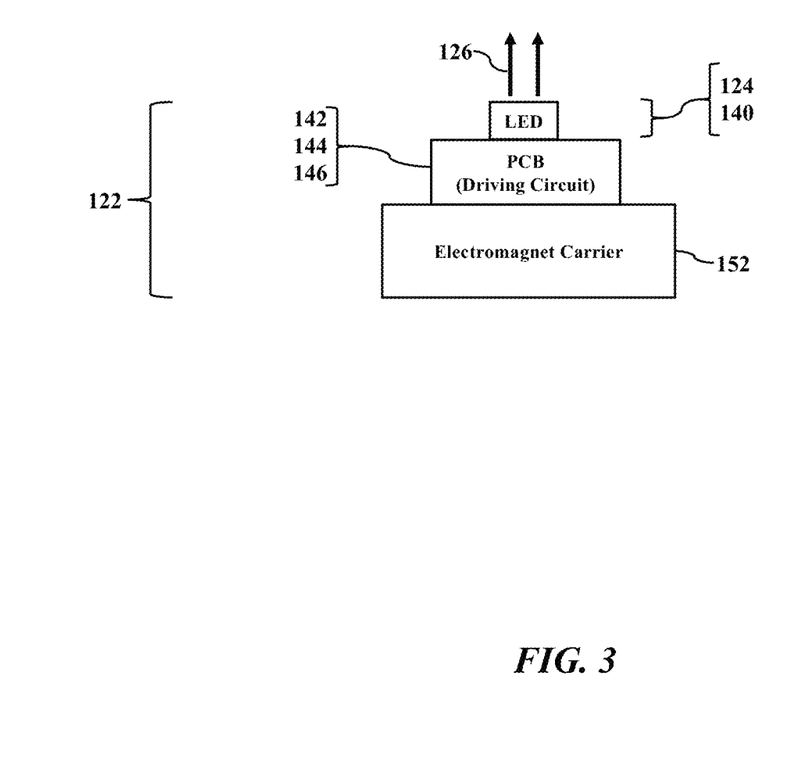
FIGS. 3-5 illustrate a backlight, according to exemplary embodiments.
Figure 4:
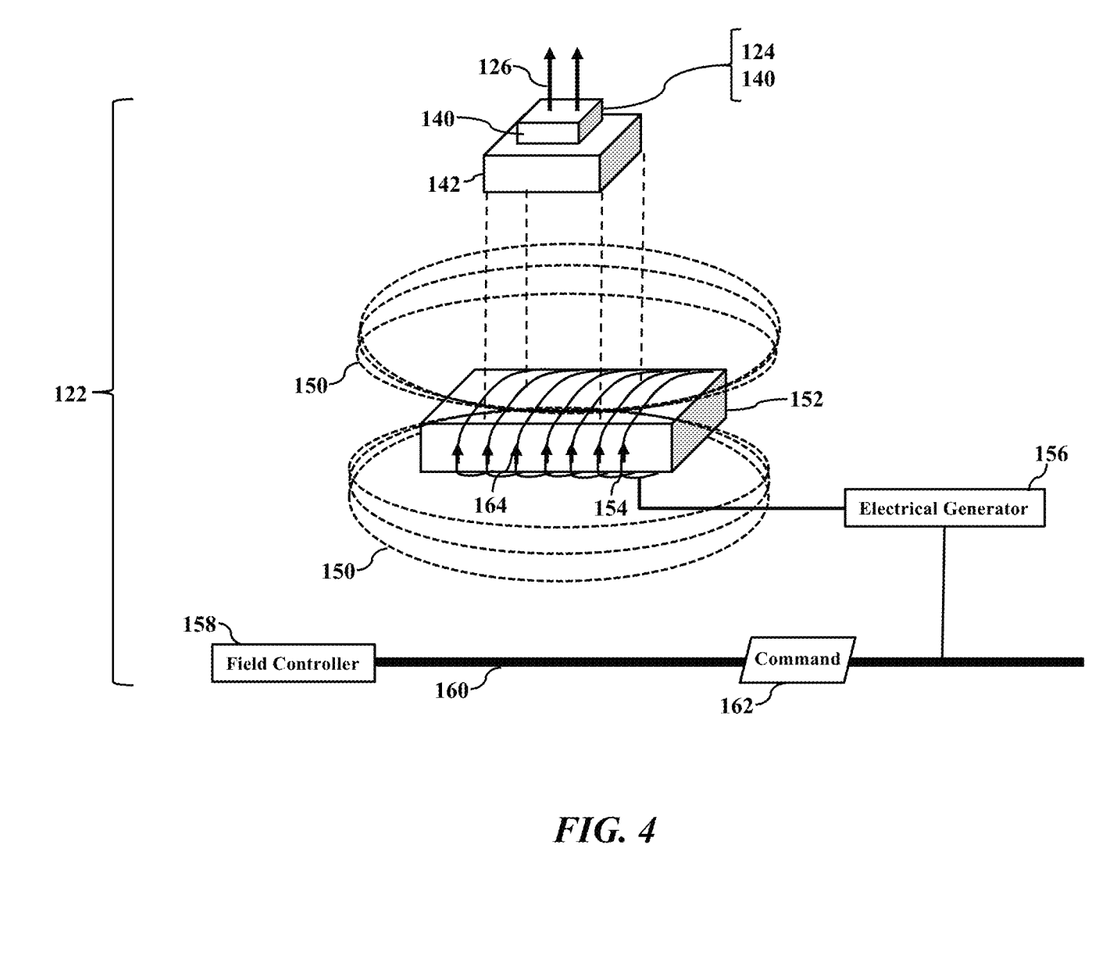
Figure 5:
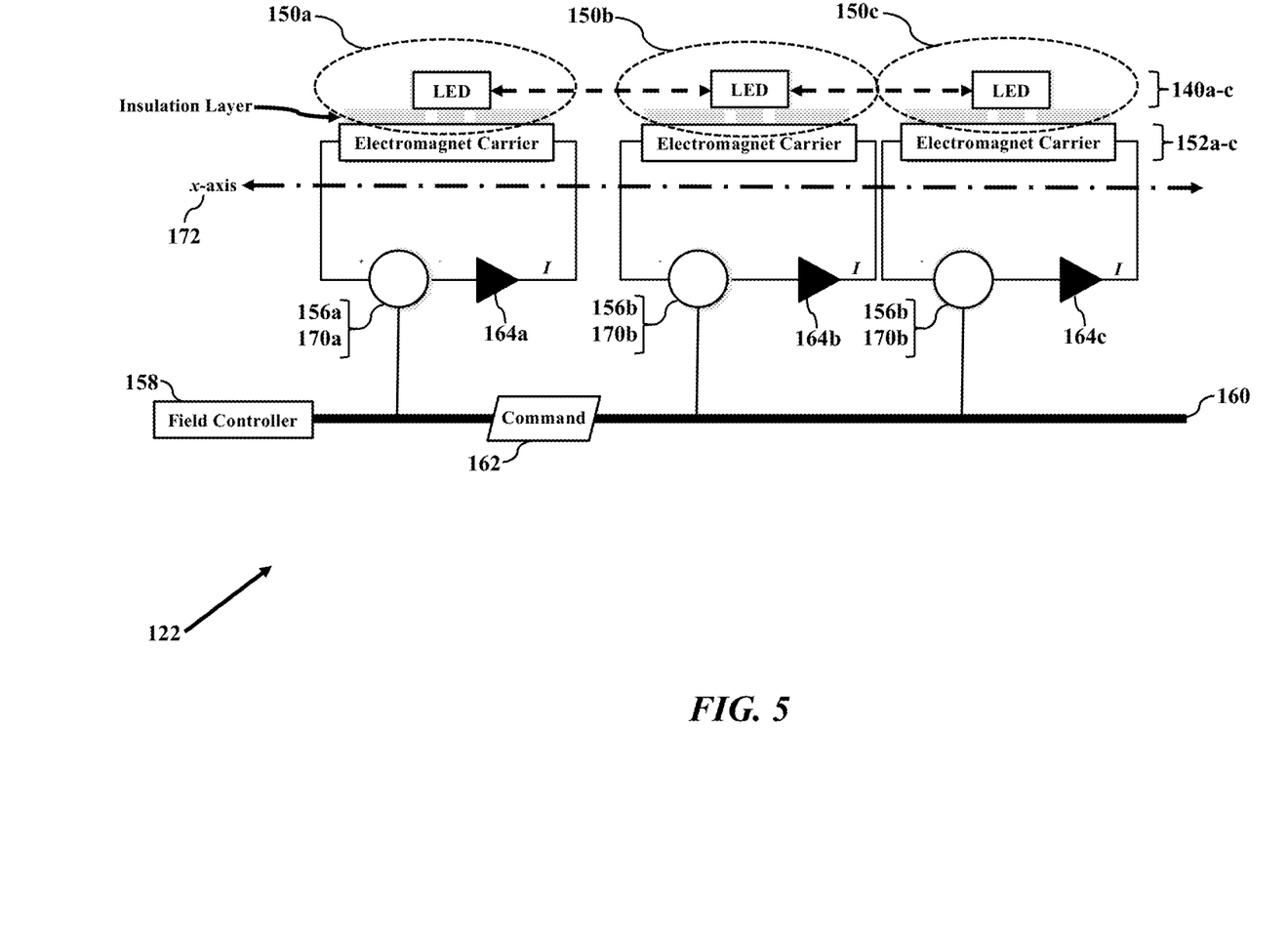

FIGS. 3-5 are more detailed illustrations of the backlight 122, according to exemplary embodiments. The backlight 122 has hundreds, thousands, or more of the light sources 124. While the light sources 124 may utilize any lamp or any other technology, FIG. 3 illustrates miniature light emitting diodes (or "LEDs") 140. Each LED 140 is surface mounted, soldered, attached, printed/deposited, or otherwise electrically connected to a printed circuit board (or "PCB") 142. The PCB 142 has electrical components and circuits (such as a driving circuit 144) that electrically activate the LED 140. The driving circuit 144, for example, provides the electrical power 146 to the LED 140, thus causing the LED 140 to generate the light 126. By varying the electrical power 146, the driving circuit 144 turns on, dims, or switches off the LED 140.

As FIG. 4 best illustrates, the backlight 122 may also produce magnetic fields 150. Each LED 140/PCB 142 may be attached or mounted to a carrier 152. One or more wire windings 154 may be wound in a coil around the carrier 152. An electrical generator 156 is electrically connected to the wire winding(s) 154. The electrical generator 156 is commanded to operate by a controller 158. The controller 158 communicates with the electrical generator 156 via a communications bus 160. The controller 158 sends commands 162 via the communications bus 160 to the electrical generator 156. One of the commands 162, for example, instructs or causes the electrical generator 156 to generate electrical power (such as current and voltage). When an electrical current 164 flows through the wire winding(s) 154, the magnetic field 150 is created. When the controller 158 commands the electrical generator 156 to cease or stop operation, the electrical current 164 is turned off or stops and the magnetic field 150 disappears. While the carrier 152 may be fabricated from any material, ferromagnetic or ferrimagnetic materials (such as iron) may concentrate and greatly enhance the magnetic field 150. The magnetic field 150 may thus be quickly increased, decreased, or otherwise changed by controlling the amount/polarity of the electric current 164 in the windings 154.

As FIG. 5 best illustrates, the positions of neighboring LEDs 140 may be adjusted. The backlight 122 has hundreds or more of the LEDs 140, perhaps arranged in a grid or array. Such a large arrangement of the LEDs 140 is too difficult to clearly illustrate. FIG. 5 thus only illustrates three (3) LEDs 140a-c. Each LED 140a-c rides on its corresponding carrier 152a-c having its corresponding electrical generator 156a-c. Each electrical generator 156a-c may be connected to the controller 158 via the communications bus 160. Each electrical generator 156a-c may have a corresponding bus/network address 170a-c, thus allowing the controller 158 to send the command(s) 162 as addressable messages. Each electrical generator 156a-c accepts, reads, and executes the message addressed to its respective address 170a-c. Because each carrier 152a-c may generate its corresponding magnetic field 150a-c, any of the carriers 152a-c may move, shift, or translate along an x-axis (illustrated reference numeral 172) in response to their neighboring magnetic fields 150a-c. That is, by adjusting the corresponding value/direction/polarity of the current 164a-c flowing through/along/outside any carrier 152a-c, the magnetic fields 150a-c interact to attract, or to repel, neighboring carriers 152a-c. The positions of the neighboring LEDs 140, in other words, may be adjusted along the x-axis 172 by adjusting the currents 164a-c flowing about the carriers 152a-c.

The carriers 152a-c have degrees of freedom. The electromagnet carriers 152a-c slide or move along the x-axis 172 in response to the magnitudes and/or interactions of the magnetic fields 150a-c. Each carrier 152a-c, for example, may have a roller bearing mechanism (not shown) that allows the corresponding carrier 152a-c to smoothly glide or roll in relation to each other and in relation to a frame or housing of the backlight 122. However, exemplary embodiments may additionally or alternatively incorporate or utilize magnetic levitation (not shown) to lift or repel the electromagnet carriers 152a-c. However the carriers 152a-c are physically or magnetically supported, the positions of the carriers 152a-c may be adjusted in response to the currents 164a-c flowing in the windings 154a-c.

Figure 6:
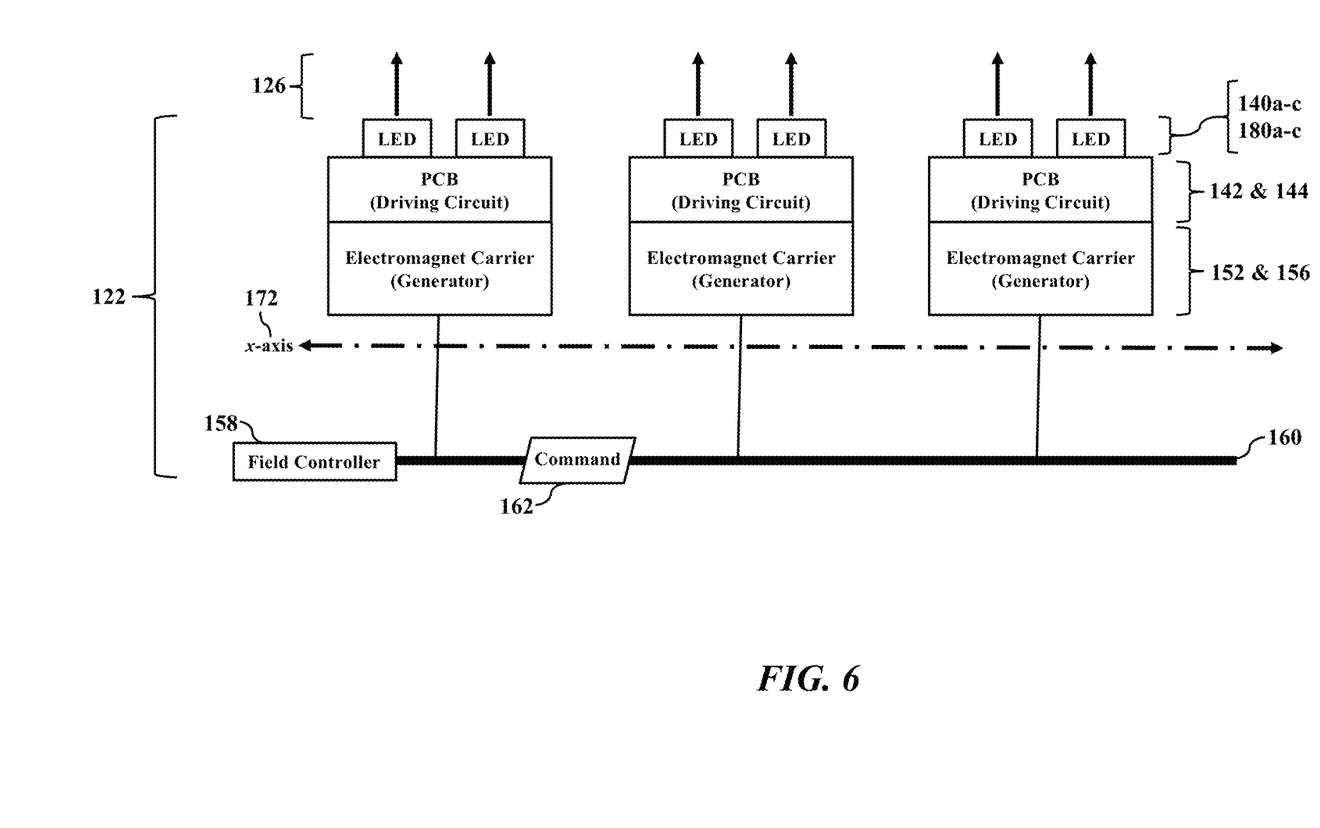
FIG. 6 illustrates positionally adjustable light zones, according to exemplary embodiments.

FIG. 6 illustrates positionally adjustable light zones 180, according to exemplary embodiments. Here each printed circuit board (or "PCB") 142a-c may have multiple light emitting diodes (or "LEDs") 140. That is, each PCB 142a-c itself may have a grid or other arrangement of multiple LEDs 140, and the driving circuit 144a-c may nearly simultaneously activate the LEDs 140a-c as a group or zone 180a-c. Each zone 180a-c of the LEDs 140 generates the light 126 in response to electrical power. Moreover, because the PCB 142a-c is mounted to the corresponding electromagnet carrier 152a-c, the controller 158 may individually command each electrical generator 156a-c to create the magnetic field 150a-c by supplying the electrical current 164a-c to the wire winding(s) 154a-c (illustrated in FIGS. 4-5). The positions of the carriers 152a-c, and thus the corresponding zones 180a-c of the LEDs 140a-c, may be adjusted in response to the currents 164a-c creating the magnetic field 150a-c.

Exemplary embodiments thus resolve the halo-effect. The halo effect is perhaps most pronounced, or visually noticeable, when displaying high contrast patterns (such as adjacent black and white color combinations). That is, a white area (displayed by the liquid crystal module 120) requires that the backlight 122 output a brighter luminance beneath the white area. Conversely, a black area (displayed by the liquid crystal module 120) requires that the backlight 122 output a darker luminance beneath the dark area (that is, dim or even turn off). As the reader/viewer knows, though, these high contrast patterns cross color boundary zones 180. White light bleeds or blooms into the dimmed or off black zones 180. Exemplary embodiments, instead, move the LEDs 140 to reduce and eliminate the halo-effect. That is, exemplary embodiments provide a mechanism in the backlight 122 to adjust the position of each light source zone 180 to match the high contrast pattern. Should a high contrast pattern have a tendency or potential to cross a boundary of light source zones 180, the controller 158 may control the positions of the electromagnet carriers 152. The controller 158, in other words, concentrates at the area that requires to support the partial white area of the pattern, so the high contrast pattern is unlikely to cross the boundary of light source zones 180 to cause the halo effect. The boundary of light source zones 180 is therefore adjustable.

Exemplary embodiments thus present an ingenious and elegant solution. LED backlit LCD displays are relatively inexpensive to manufacture, do not have screen "burn in," are reliable over long periods of usage, and generally have great picture quality. However, dark black and contrasting bright white colors have long been a drawback. Exemplary embodiments overcome the halo-effect by slightly altering/modifying the physical positions of the carriers 152 and, thus, their LEDs 140. The white light 126 emitted by the LEDs 140 may be moved away from dark/black color zones, thereby reducing greying and washing out. The white light 126 output by the LEDs 140, in other words, may be concentrated in positional locations in response to the image 132 generated by the LCD module 120. Moreover, the white light 126 output by the LEDs 140 may additionally be dimmed to further reduce/eliminate the halo-effect.

Figure 7:
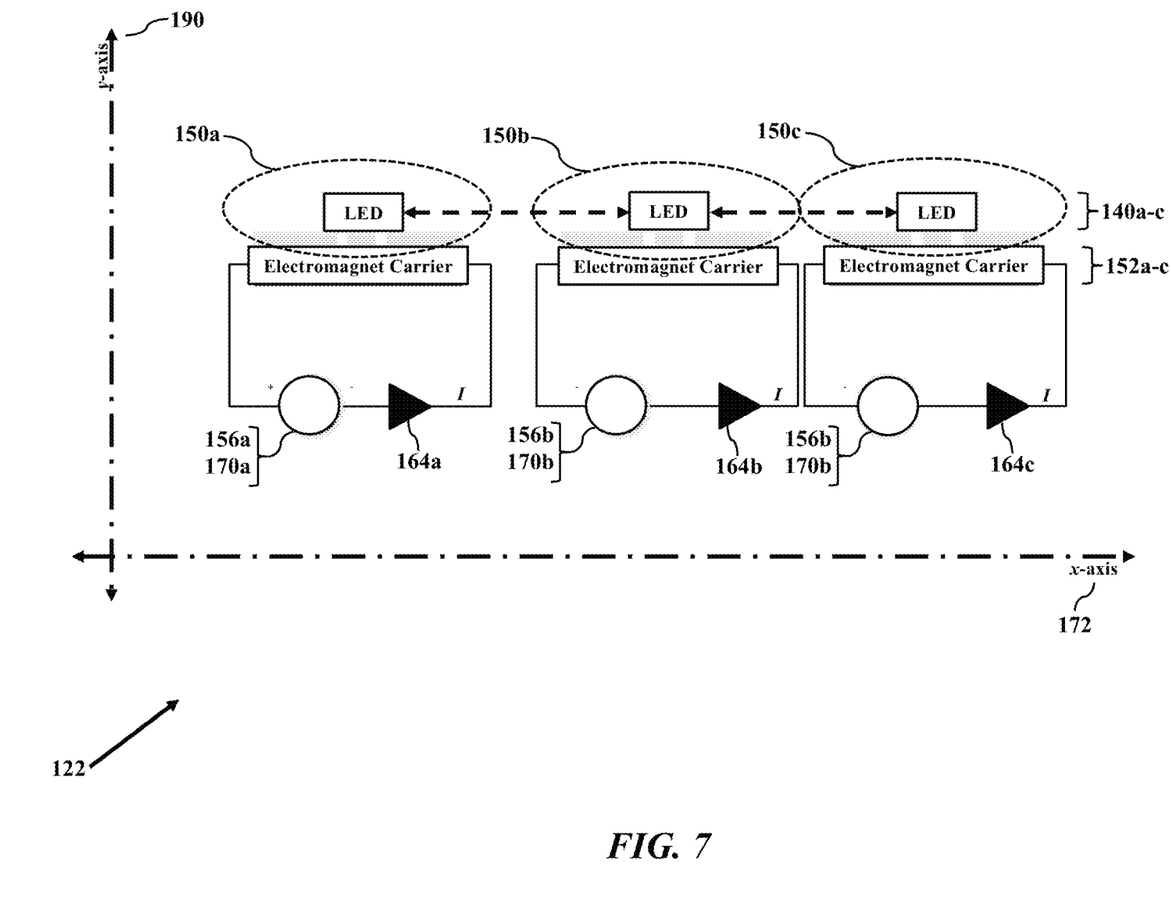
FIG. 7 illustrates two-dimensional adjustment, according to exemplary embodiments.

FIG. 7 illustrates two-dimensional adjustment, according to exemplary embodiments. The above paragraphs explain how the positions of the carriers 152a-c, and thus their respective LEDs 140a-c, may be adjusted along the x-axis 172 (by varying the magnetic fields 150a-c). Exemplary embodiments, however, may also adjust the positions of the carriers 152a-c along ay-axis (illustrated as reference numeral 190). That is, exemplary embodiments may additionally or alternatively vary the currents 164a-c creating the magnetic fields 150a-c to move or shift the carriers 152a-c along they-axis 190. The carriers 152a-c may thus be moved in two-dimensions to further adjust the positions of the zones 180-c of the LEDs 140a-c and to further refine white/black coloring.

Figure 8:
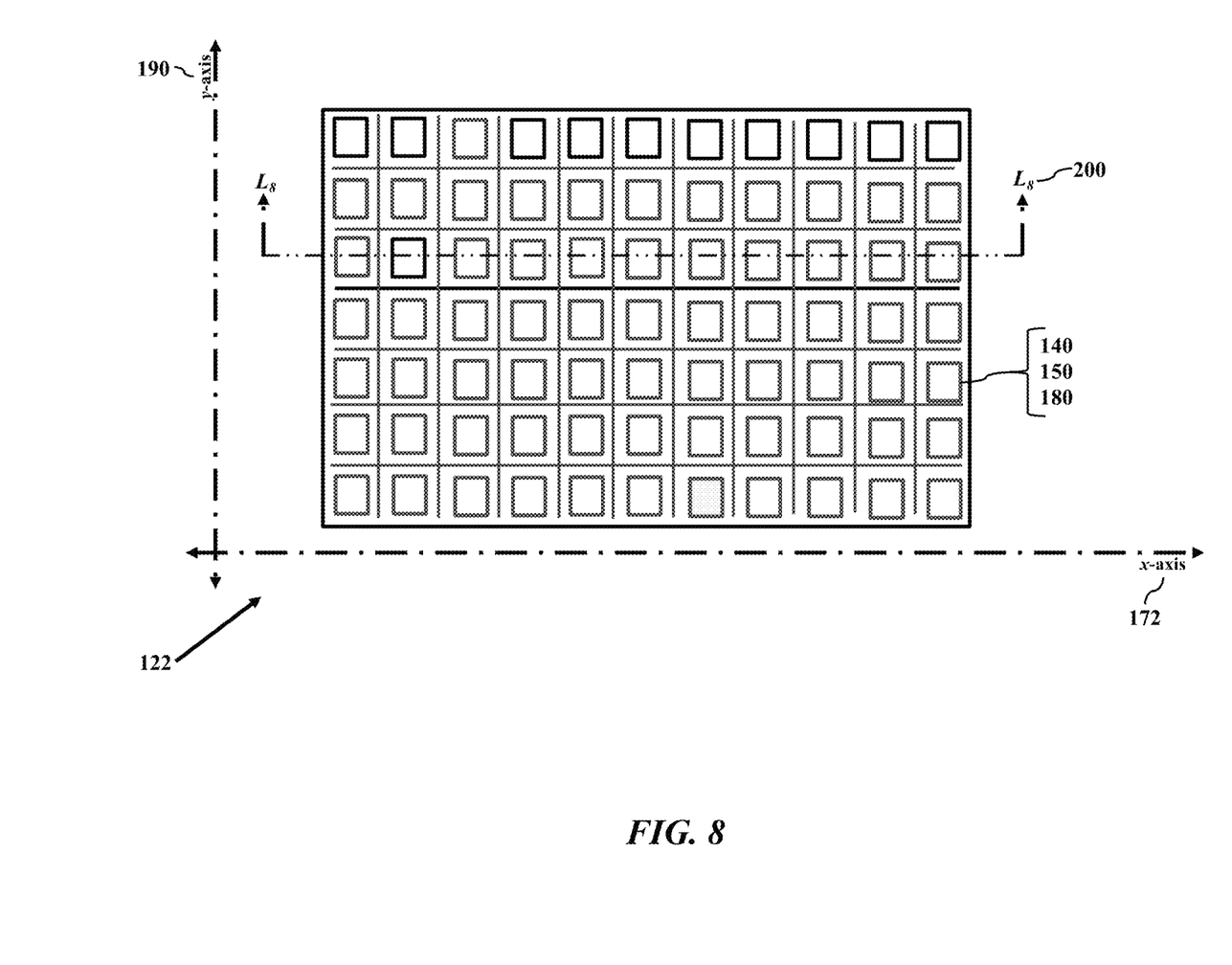
FIGS. 8-9 illustrate more details of the backlight, according to exemplary embodiments.
Figure 9:
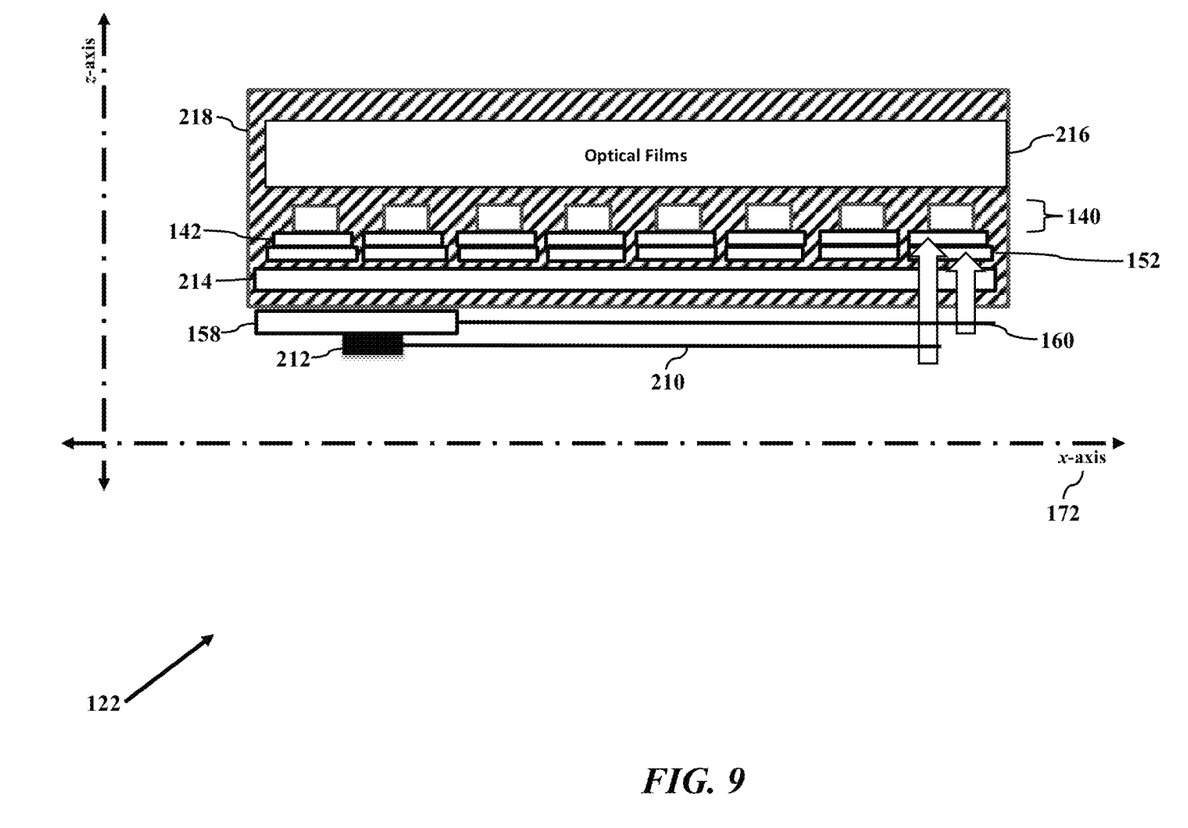

FIGS. 8-9 illustrate more details of the backlight 122, according to exemplary embodiments. FIG. 8 is a top or plan view of the backlight 122, while FIG. 9 is a sectional view of the backlight 122 taken along line $L_8$-$L_8$ (illustrated as reference numeral 200) of FIG. 8. The backlight 122 has the many zones 180 of the LEDs 140. The LEDs 140 are mounted to their respective PCBs 142, which are also mounted or secured to their respective carriers 152. Each carrier 152 may have an electrical connection to the communications bus 160, thus allowing the controller 158 to issue addressable commands that change the x-y position. The carrier 152 may have another electrical connection to another communications bus 210, thus allowing an LED emission controller 212 to issue addressable emission/luminance commands that change the output of the LEDs 140 mounted to the PCB 142. The backlight 122 may further include control circuitry 214 that controls the electrical power provided to the carrier 152 and to the LEDs 140. The backlight 122 may further include one or more optical films 216 that refine/concentrate/diffuse/guide the light output generated by the LEDs 140. The backlight 122 may further include a frame 218 that houses the components. The frame 218, more particularly, may have walls, ceilings, and other barriers that confine the motions of the carriers 152, thus limiting or restricting their positional movements to defined dimensional boxes or chambers.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A backlight comprising:
a plurality of light sources arranged in a grid in a plane; and
for each one of the light sources, an electromagnet carrier affixed to the associated light source, the electromagnetic carrier moving a position of the associated light source in a first axis in the plane and in a second axis in the plane in response to an electrical current.

2. The backlight of claim 1, further comprising, for each one of the electromagnetic carriers, a generator that generates the electrical current that moves the position of the associated light source within the backlight.

3. The backlight of claim 2, further comprising a controller coupled to the generators, the controller commanding each generator to generate the associated electrical current.

4. The backlight of claim 2, further comprising a communications bus coupling each generator to a controller that commands the generator to generate the associated electrical current.

5. The backlight of claim 1, wherein the light sources each include a light emitting diode moved by the associated electromagnet carrier.

6. The backlight of claim 1, wherein the light sources each include multiple light emitting diodes moved by the associated electromagnet carrier.

7. The backlight of claim 1, further comprising a frame confining the position of the light sources.

8. A backlight comprising:
a plurality of electromagnet carriers arranged in a grid in a plane;

for each electromagnetic carrier, a printed circuit board attached to the associated electromagnet carrier;

for each printed circuit board, a light source mounted to the associated printed circuit board; and for each of the electromagnetic carriers, a generator positioning the light source in a first axis in the plane and in a second axis in the plane by supplying an electrical current to the associated electromagnet carrier.

9. The backlight of claim 8, further comprising a controller that commands the generators to generate the associated electrical current.

10. The backlight of claim 9, further comprising a communications bus connecting the generators to et controller.

11. The backlight of claim 8, wherein the light source each include a light emitting diode moved by the associated electromagnet carrier.

12. The backlight of claim 8, wherein each light source comprises multiple light emitting diodes moved by the associated electromagnet carrier.

13. The backlight of claim 8, further comprising a frame confining a position of the light sources.

14. The backlight of claim 8, further comprising a driving circuit providing an electrical power to the light sources.

15. The backlight of claim 14, further comprising a communications bus connecting the driving circuit to a controller for controlling an output emitted by the light sources.

16. A liquid crystal display, comprising:

a liquid crystal module; and a backlight illuminating the liquid crystal module using a rid of position-adjustable light sources, each light source moving in a first axis in a plane and in a second axis in the plane via an associated magnetic field created by an associated electromagnet carrier.

17. The liquid crystal display of claim 16, further comprising a plurality of generators, each generator supplying an electrical current to an associated electromagnet carrier.

18. The liquid crystal display of claim 17, further comprising a communications bus connecting the generators to a controller that commands the generators to supply the electrical current to the associated electromagnet carriers.

19. The liquid crystal display of claim 17, wherein the light sources each comprise at least one light emitting diode.

20. The liquid crystal display of claim 17, further comprising a frame confining a position of the light sources.

* * * * *